Oct. 29, 1929.                S. G. BARNARD                1,733,988
                           LOAD ELEVATING TRUCK
                            Filed Aug. 8, 1928
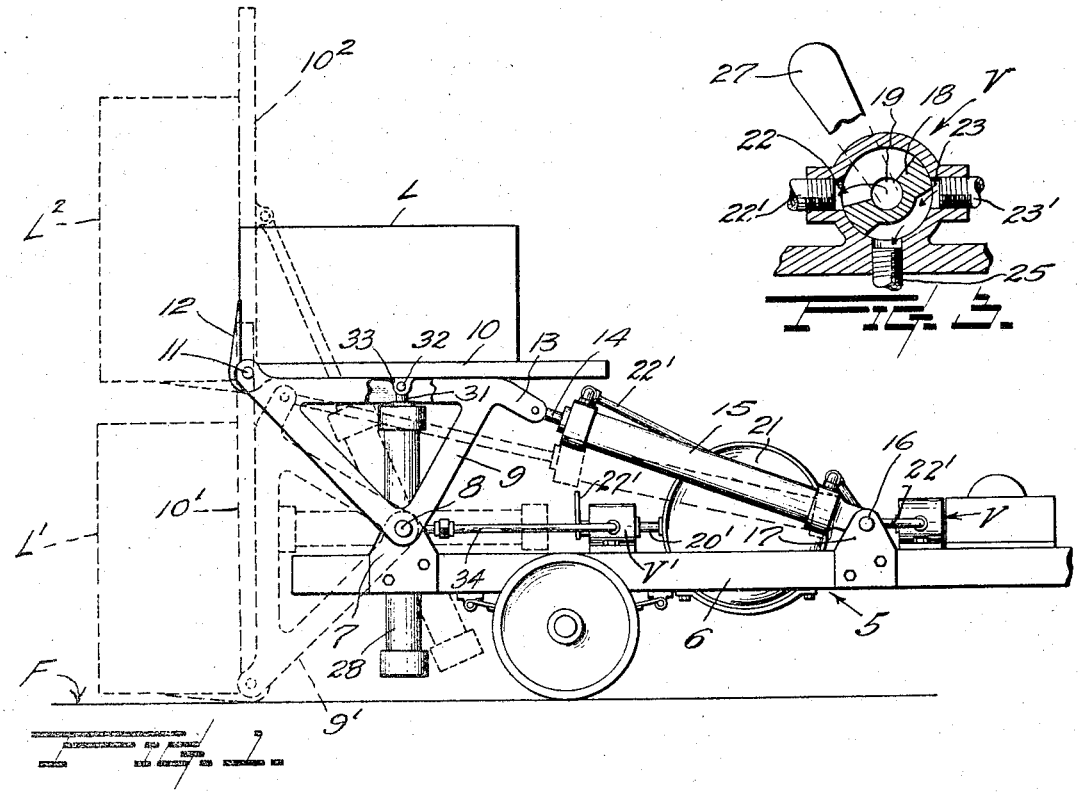
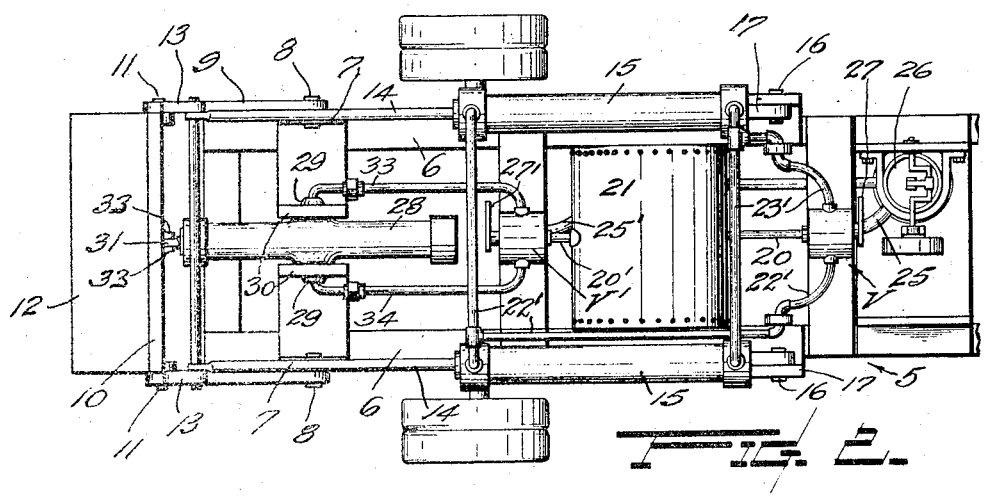
INVENTOR:
Samuel G. Barnard
BY
Pierre Barnes
ATTORNEY Patented Oct. 29, 1929

1,733,988

UNITED STATES PATENT OFFICE

SAMUEL G. BARNARD, OF SEATTLE, WASHINGTON

LOAD-ELEVATING TRUCK

Application filed August 8, 1928. Serial No. 298,146.

This invention relates to freight elevating and transporting apparatus.

The object of my invention is to provide apparatus of this character which is peculiarly adapted for use in warehouses, on marine vessels and railway cars, for moving freight thereon, for raising freight into position for loading a vehicle, or for stacking or piling the freight.

More specific objects and advantages of the invention will appear in the following description.

The invention consists in the novel construction, adaptation and combination of parts hereinafter described and claimed.

In the accompanying drawings,—

Figure 1 is a side elevation of the end of a wheeled vehicle with an embodiment of the present invention applied thereto with a representation of a load, the load elevating and tilting devices being shown by full lines the positions they occupy when a load is transported by the travel of the vehicle and shown by dotted lines when in other operative positions. Fig. 2 is a plan view of Fig. 1 except that the movable frame is represented in different positions than those in which they are shown in the preceding view. Fig. 3 is a transverse vertical view of one of the four-way controlling valves for the power cylinders.

In said drawing, the reference numeral 5 represents the chassis or framework of a wheeled vehicle. Rigidly secured to the side bars 6 of said frame at a short distance from an end thereof are supports 7 for axially aligned pins 8 which serve as pivotal connections for a tiltable frame 9, hereinafter designated as the elevating frame.

A second frame 10, hereinafter designated as the auxiliary frame is tiltably connected by pivot pins 11 near one end of the frame to the rear end of the elevating frame 9.

Said auxiliary frame has extending at right angles thereto, or nearly so, a lip element 12 which is adapted to be engaged under a load when the auxiliary frame is in a relatively vertical position as represented, for examples, by $10^1$ and $10^2$ in dotted lines in Fig. 1 and as shown by full lines in Fig. 2.

Connected to the arms 13 of the frame 9 are the ends of piston rods 14, the pistons of which (not shown) operate in cylinders 15 which are connected at 16 for oscillatory movement to lug attachments 17 of the chassis 5. These cylinders, and the associated pistons constitute a motor which is operated by a fluid power medium, preferably oil, regulated by a suitable valve V as illustrated for example in Fig. 3. As shown, the valve proper, indicated by 18 is of the four-way type for controlling the flow of the power medium from the supply opening 19, connected by a pipe 20 with a reservoir 21 for fluid under pressure, to one or the other of ports 22 or 23 connected by pipes $22^1$ and $23^1$ with the opposite ends of said cylinders. Said valve also controls communication between such cylinder ends, through the respective ports, and an exhaust pipe 25 leading to a pump 26 (Fig. 2) whereby the oil discharged from the cylinder is returned under pressure into the reservoir 21. Said valve is regulated manually by means of a handle 27 connected to the valve spindle exterior of the valve casing. As represented in Fig. 3 the valve adjustment is such as to supply oil through pipes $22^1$ to the outer ends of the cylinders 15 and exhaust the oil from their inner ends through pipes $23^1$ and 25, whereby the pistons within the respective cylinders are moved into positions to move the elevating frame into the position in which it is shown by full lines in Fig. 1.

When adjustment of the valve is such as to reverse the direction of oil to cause the cylinder pistons to be thrust outwardly, the frame 9 is tilted rearwardly and thence lowered into its dotted line position $9^1$ in Fig. 1, or to any desired intermediate elevation.

The valve 18, moreover, may be adjusted to cover the ports 22 and 23 so that the oil is restrained within both ends of each cylinder, an advantageous condition for maintaining the elevating frame at a selected elevation when the vehicle is employed in transporting a load, or when the auxiliary frame is to be operated independently of the elevating frame.

For regulating movement of the auxiliary frame 10 and maintaining the same in adjusted positions with respect to the elevating frame in every adjustment of the latter, I provide a second motor comprising a cylinder 28 mounted for oscillatory motion upon trunnions 29 which are journaled in supports 30 rigid with the chassis.

The axis of the trunnions 29 are in alignment with the axis of the pins 8 about which the elevating frame is movable. The piston of the motor cylinder 28 has a piston rod 31 which is connected by a pin 32 with lug elements 33 rigid with the frame 10. The cylinder 28 is connected from its opposite ends by means of channels (not shown) with passages extending through the respective trunnions 29 and thence by pipes 33 and 34 with a valve $V^1$ which may be similar in construction and arrangement of ports to that pertaining to the motor for operating the elevating frame and hereinbefore described with reference to Fig. 3.

The valve $V^1$ is provided with a fluid supply pipe $20^1$ communicating with the reservoir 21 and also with an exhaust pipe $25^1$ leading to the pump 26.

The valve for the motor cylinder 28 is regulated by a handle $27^1$ admitting the power medium into one or the other end of the cylinder or holding such medium in both ends of the cylinder according to a desired movement of the auxiliary frame relative to the elevating frame, or for holding the auxiliary frame in an adjusted position with respect to the elevating frame.

In Fig. 1 the apparatus is illustrated as holding a load L, as a box of merchandise for instance, upon the frame 10 supported horizontally upon the elevating frame 9 represented as being above the chassis.

Such relative arrangement of parts is suitable when transporting the load. The load may be moved into the position in which it is represented by dotted lines $L^2$ by causing the auxiliary frame to be swung upwardly into its dotted line $10^2$ position. This last mentioned position of the frame 10 is suitable for the delivery of the load into a motor car, piling boxes, etc., in a warehouse or the like. To deposit the load upon the floor F, the two frames 9 and 10 are swung as a unit about the axis of pins 8 into their dotted line $9^1$ and $10^1$ positions, carrying the load into its $L^1$ position.

The load is taken from the floor F by tilting the load backwardly by protruding the free end of the auxiliary frame sufficiently to provide space for the frame lip 12 below the load, whereupon the vehicle is moved to carry the lip into such space and into load engaging relation for hoisting the same.

The operation of the invention will, it is thought, be understood from the foregoing description of the herein illustrated embodiment.

What I claim, is:—

1. In apparatus of the character described, the combination with a truck, of a load elevating frame pivotally connected to the truck frame, an auxiliary frame pivotally connected to an end of said elevating frame, said auxiliary frame being provided with a lip element adapted to engage under a load, means connected to the elevating frame to effect the raising and lowering both frames as a unit, and means connected to the auxiliary frame for tilting the same independently of the elevating frame.

2. In apparatus of the character described, the combination with a truck, of a load elevating frame tiltably connected to a truck, an auxiliary frame tiltably connected to said elevating frame, said auxiliary frame being provided with a load-engaging element, power operated devices for raising and lowering selectively both of said frames, and power operated devices acting supplementary to the first named devices for effecting movement of the auxiliary frame independently of the elevating frame.

3. In apparatus of the character described, the combination with a truck frame, of a load elevating frame pivotally connected thereto for tilting movement, a fluid pressure means operatively connected to said elevating frame, an auxiliary frame pivotally connected to the elevating frame, fluid pressure means operatively connected to the auxiliary frame for imparting tilting movements thereto with respect to the elevating frame, said last named means including a cylinder mounted for oscillatory movement about the axis of the pivotal connection of the elevating frame with respect to the truck frame, and means for supplying the power medium for operating the power means for the elevating and auxiliary frames selectively.

Signed at Seattle, Washington, this 2nd day of July, 1928.

SAMUEL G. BARNARD.